Dec. 9, 1924.
G. T. SNYDER
HAMMER
Filed May 19, 1923
1,519,069
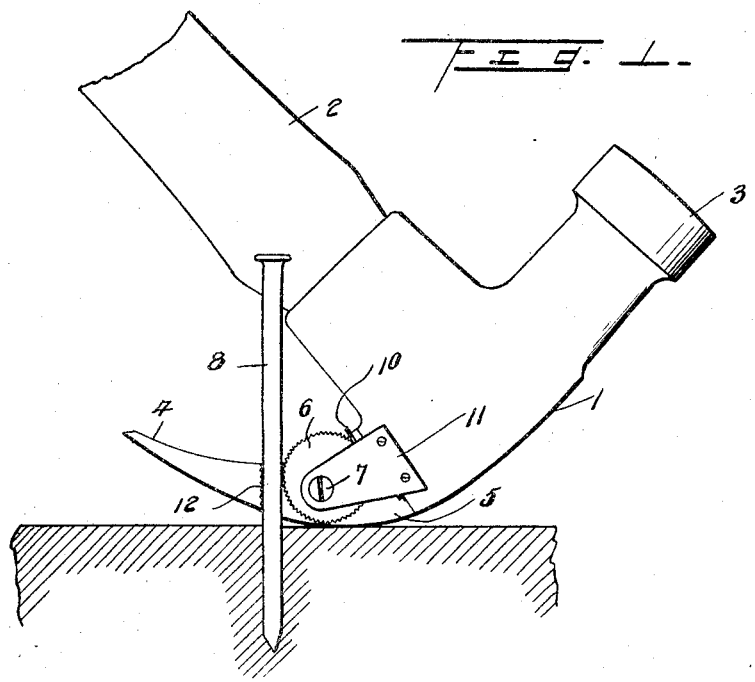
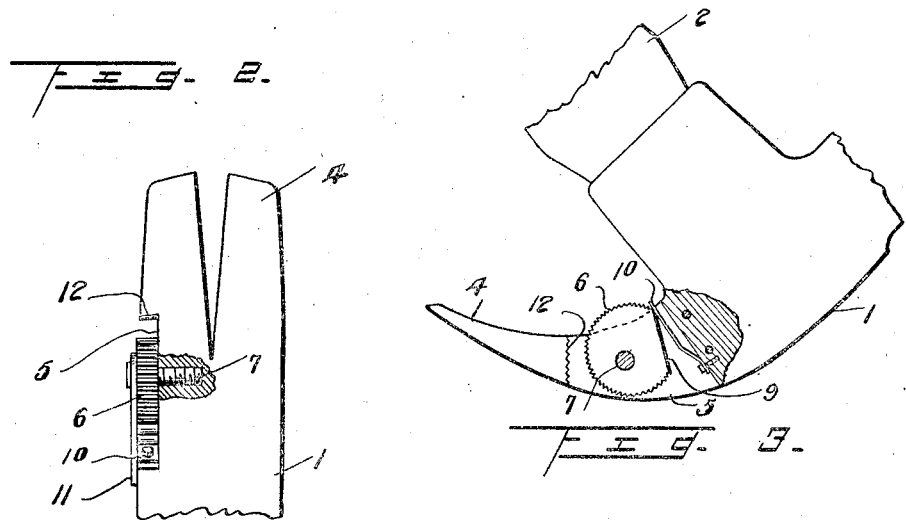
Inventor
G. T. Snyder,
By
Attorney Patented Dec. 9, 1924.

1,519,069

UNITED STATES PATENT OFFICE.

GEORGE T. SNYDER, OF NATCHEZ, MISSISSIPPI.

HAMMER.

Application filed May 19, 1923. Serial No. 640,150.

*To all whom it may concern:*

Be it known that I, GEORGE T. SNYDER, a citizen of the United States, residing at Natchez, in the county of Adams and State of Mississippi, have invented certain new and useful Improvements in Hammers; and I do hereby declare the following to be a full, clear, and exact description of the invention, such as will enable others skilled in the art to which it appertains to make and use the same.

The invention has relation to tools and has for its primary object the provision of a claw hammer having a gripping attachment which enables an intermittent grip being obtained upon a nail whereby to apply the maximum leverage in the extraction thereof, and which gripping attachment enables the hammer to be used as a wire stretcher and also to extract nails of different sizes, both as to length and diameter.

Other objects and advantages will be apparent and suggest themselves as the nature of the invention is understood.

While the drawings illustrate an embodiment of the invention it is to be understood that in adapting the same to meet different conditions and requirements, various changes in the form, proportion and minor details of construction may be resorted to without departing from the nature of the invention.

Referring to the accompanying drawings forming a part of the application:

Figure 1 is a side view of a claw hammer embodying the invention and showing the same in operation, Figure 2 is a detail view of the claw portion of the hammer, a portion being broken away to show the pivot upon which the dog is mounted, and Figure 3 is a detail side view of a portion of the hammer having a portion broken away.

Corresponding and like parts are referred to in the following description and designated in the several views of the drawings by like reference characters.

The numeral 1 designates the head of a claw hammer, to which is fitted a handle 2, said head including a pole 3 and a claw 4. A recess 5 is formed in a side of the head 1 and receives a dog 6 which is pivotally mounted upon a screw 7 or analogous pivot. The dog 6 is of circular outline and mounted eccentrically upon the pivot 7 and its outer edge is roughened to enable a firm grip being obtained upon the nail 8 or other article to be pulled. An edge portion of the dog 6 is flattened, as indicated at 9, and a spring 10 cooperates therewith to cause the dog to automatically grip the parts to be pulled. A plate 11 is secured at one end to the hammer head and extends across the open side of the recess 5 and receives the outer end of the pivot 7. This plate provides additional supporting means for the pivot and operates in a measure as a guard to protect the dog and the spring cooperating therewith. The shoulder 12 formed at one end of the recess 5 is slightly undercut, as indicated in Figure 2, and is roughened to enable a firm grip being obtained upon the nail 8 or other part.

It is observed that the arrangement is such as to enable the pulling force being applied to the nail or other part close to the support upon which the hammer fulcrums and as a result a maximum leverage may be exerted and a nail may be extracted by stages by obtaining an intermittent grip thereon and furthermore by having the dog mounted eccentrically it will effectively grip nails of different diameters. For stretching a wire, the latter may be gripped between the shoulder 12 and dog 6 in substantially the same manner as the nail 8 shown in Figure 1 is gripped to be extracted by moving the outer end of the handle 2 upwardly and forwardly as will be readily understood.

What is claimed is:

A hammer head having a recess open at a side thereof providing a gripping jaw at one end of the recess, a dog having an arcuate surface and a flat surface at its marginal edge, the arcuate surface serving as a grip to coact with said jaw, a spring secured at one end to the hammer head in said recess and having its opposite end engaging said flat portion of the dog, a plate extending across the open side of the recess and terminating short of said jaw, and a pivot member extending eccentrically through said dog, and supported by said plate and hammer head.

In testimony whereof I affix my signature in presence of two witnesses.

GEORGE T. SNYDER.

Witnesses:
J. S. DIXON,
V. L. PERRAULT.